H. Von Schlagintweit-Sakünlünski,
Revolving Scale.

No. 97,138. Patented Nov. 23, 1869.

Witnesses;
A. E. Gale
C. A. Graves

Inventor;
Hermann Von Schlagintweit Sakünlünski
Per his attorney
C. D. Gale

United States Patent Office.

HERMANN VON SCHLAGINTWEIT-SAKÜNLÜNSKI, OF MUNICH, BAVARIA.

Letters Patent No. 97,138, dated November 23, 1869.

IMPROVEMENT IN REVOLVING SCALES.

The Schedule referred to in these Letters Patent and making part of the same.

Be it known that I, HERMANN VON SCHLAGINTWEIT-SAKÜNLÜNSKI, of the city of Munich, and the Kingdom of Bavaria, have invented a new and useful instrument for measuring straight and curved lines on maps, charts, plats of ground, lengths of rivers, roads, rails, &c., called a Revolving Scale; and I hereby declare that the following is a full and sufficient description thereof, reference being had to the accompanying drawings, and references thereon, making a part of the description.

Figure 1:
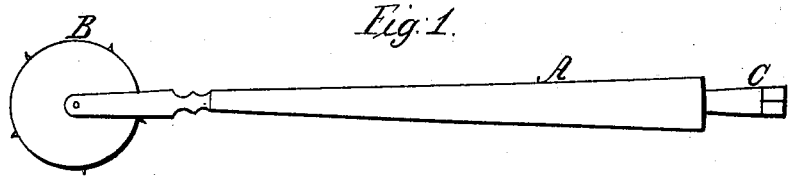

Let Figure 1 represent a horizontal elevation of the instrument.

Figure 2:

Figure 2, a vertical view, showing the spurred wheel by an edge view, showing the click-bar $d$ and the pin $x$.

Figure 3:
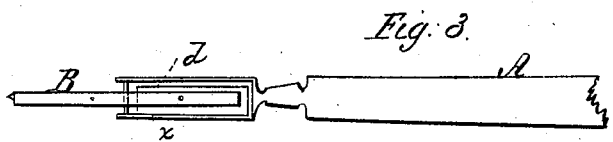

Figure 3 is an enlarged view of the fig. 2.

The nature of the invention consists in the construction of an instrument, to be held in the hand, and called a revolving scale, made up of a shaft, A, or handle, revolving wheel B, with five spurs on its periphery, for exactly measuring the space passed over, and a click-bar, $d$, and pin $x$, which bar strikes against the revolving pin in wheel B, and gives a sound that the spur has simultaneously struck the paper, while the click-bar $d$ strikes the pin; also, on the opposite end of the shaft A is a measuring-plate, C, of the exact distance from spur to spur on the periphery of the spur-wheel, for correcting any supposed error in the index of the wheel.

The plate C is divided into tenths, so as to indicate any fraction of space left by the spur-wheel, or to correct any other error that may occur.

Having stated the nature of the invention, and the mode of using it,

What I claim as my invention, is—

The combination of the graduated scale C, at the extremity of the handle A, with the pointed spur-wheel B, formed and operating substantially as described.

Munich, 20th January, 1869.

HERMANN VON SCHLAGINTWEIT-SAKÜNLÜNSKI.

Witnesses:
FRANCIS H. KIRMAYER,
W. N. WHOLLS.